United States Patent [19]

Woodacre

[11] 4,007,085
[45] Feb. 8, 1977

[54] NUCLEAR REACTOR FUEL ELEMENTS

[75] Inventor: Albert Woodacre, Blackpool, England

[73] Assignee: United Kingdom Atomic Energy Authority, London, England

[22] Filed: Jan. 20, 1975

[21] Appl. No.: 542,512

[30] Foreign Application Priority Data

Jan. 21, 1974 United Kingdom .............. 2753/74

[52] U.S. Cl. .............................. 176/80; 176/19 R; 176/68; 340/168 R
[51] Int. Cl.² ........................................ G21C 3/10
[58] Field of Search .............. 176/19 R, 19 LD, 68, 176/80; 340/168

[56] References Cited

UNITED STATES PATENTS

| | | | |
|---|---|---|---|
| 3,296,081 | 1/1967 | Wildgoose | 176/19 R |
| 3,663,363 | 5/1972 | Crouthamel et al. | 176/19 LD |
| 3,666,625 | 5/1972 | Nybo | 176/19 LD X |
| 3,848,466 | 11/1974 | Dial et al. | 176/19 R X |
| 3,886,037 | 5/1975 | Schlenker | 176/68 |

FOREIGN PATENTS OR APPLICATIONS 657,235 2/1963 Canada .............................. 176/19 R Primary Examiner—Samuel W. Engle
Assistant Examiner—Peter A. Nelson
Attorney, Agent, or Firm—Larson, Taylor and Hinds

[57] ABSTRACT

A nuclear reactor fuel element has within its protective sheath an insert whereby it may be uniquely identified. The insert bears an array of markings at spaced positions to produce a series of clock pulses on presentation of the insert to a detector responsive to each marking and further markings at some only of the spaced positions to vary the series of signals produced on presentation of the insert to the detector, thereby providing numerical identification pulses.

4 Claims, 4 Drawing Figures

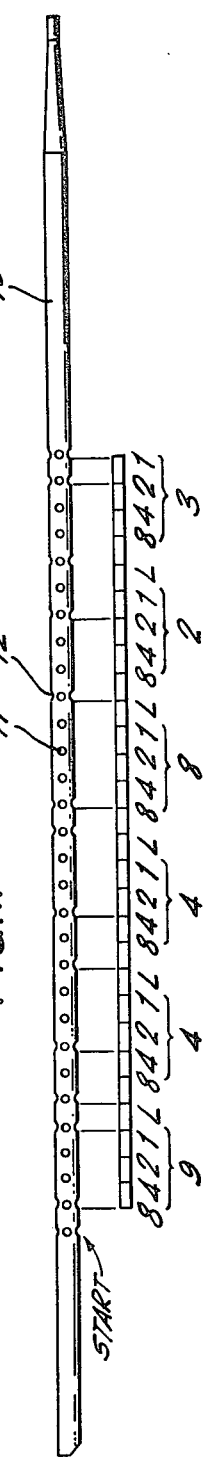
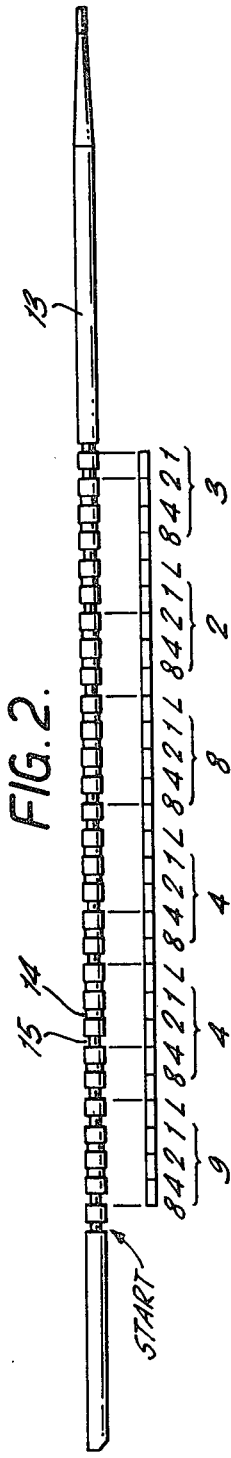
FIG. 1.
FIG. 2.

NUCLEAR REACTOR FUEL ELEMENTS

BACKGROUND OF THE INVENTION

This invention relates to nuclear reactor fuel elements.

It has been proposed that nuclear reactor fuel elements of the kind in which nuclear fuel material is enclosed in a protective sheath should be individually identifiable by providing within each sheath an insert which is unique to that fuel element. Such inserts may conveniently be provided with markings whereby a digital output train of pulses can be produced, on passage of the fuel element through an activated eddy current head, for example, and de-coding equipment can readily be devised to accept these sequential pulses. However this is a time dependent function and if the position of the markings is to be correctly identified it is essential to control strictly the relative movement of insert and marking detector. This may be difficult.

SUMMARY OF THE INVENTION

According to the present invention an insert for a nuclear reactor fuel element whereby the fuel element may be individually identified bears an array of markings at spaced positions to produce a series of signals on presentation of the insert to a detector responsive to each marking and further markings at some only of said positions to vary the series of signals produced on presentation to the detector. The insert can thus provide both clock pulses from the array of markings at spaced positions and numerical identification pulses from the further markings to ensure uncritical time dependence when the insert is passed through a detector.

Also according to the invention is a nuclear reactor fuel element comprising nuclear fuel material within a protective sheath and including within the sheath an insert in accordance with the preceding paragraph.

Preferably the insert is a bar of metal in which all the markings are holes extending through the bar, the further markings being at right angles to the array at spaced positions. As an alternative to holes the markings may be grooves with the further markings provided by deepening the grooves. The bar may be hollow, that is tubular in form.

For the further markings which are to provide the individual identification a binary coded decimal system is preferred, that is one in which four markings are provided for each decade to represent 8, 4, 2, and 1. A further marking may also be provided similarly to provide a lead-in pulse for each decade.

DESCRIPTION OF THE DRAWINGS

The invention will now be described with reference to the accompanying drawings wherein FIGS. 1 and 2 are side views of inserts in accordance with the invention.

DESCRIPTION OF PREFERRED EMBODIMENTS

Figure 3:
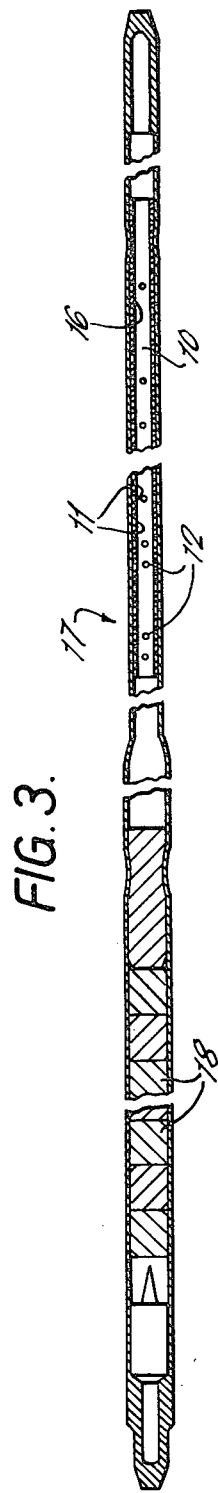
FIG. 3 is a side view in section of a nuclear fuel element including an insert in accordance with the invention.

In FIG. 1 of the drawings is shown an insert 10 in which the markings are holes extending through the insert. The holes 11 provide the clock pulses and the larger holes 12 at right angles to them provide the further markings which supply the numerical identification as indicated in the drawing, the letter L indicating the lead-in position for each decade. Typically for an insert ¼ inch in diameter the holes 11 have a diameter of 3/64 inch and the holes 12 a diameter of 1/16 inch. Similarly FIG. 2 of the drawings shows an insert 13 in which the markings are grooves 14, 15. The grooves 15 are deeper than the grooves 14 to provide the further markings which supply the numerical identification and lead-in positions as in FIG. 1. Typically for an insert ¼ inch in diameter the grooves 14 have a nominal depth of 0.007 inch and the grooves 15 a nominal depth of 0.014 inch.

Figure 4:
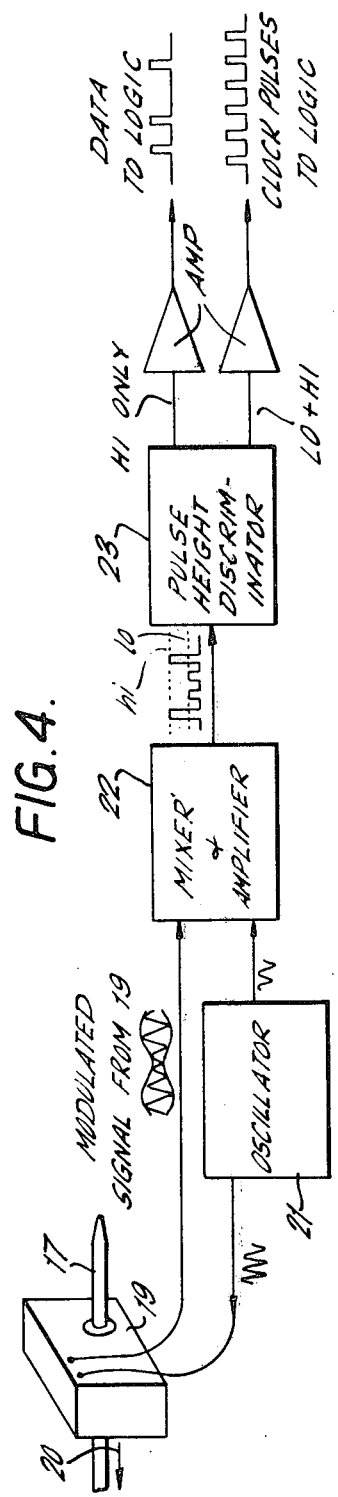
FIG. 4 is a diagrammatic representation of a read-out arrangement for the fuel element of FIG. 3.

FIG. 3 of the drawings shows the insert 10 of FIG. 1 held by crimping of sheath 16 within a nuclear fuel element 17 which also includes nuclear fuel pellets 18 within the sheath 16. In FIG. 4 of the drawings the fuel element 17 is shown being drawn through an encircling eddy current reading head 19 in the direction of arrow 20. In the eddy current head electrical pulses from an oscillator 21 are modulated in response to the presence of the markings on the insert within the fuel element and these modulated pulses are compared with the pulses from the oscillator 21 in a mixer and amplifier 22 from which high and low level pulses are obtained. These high and low level pulses are fed into a pulse height discriminator 23 in which the high level pulses are distinguished and with the combined high and low level pulses (clock pulses) applied to a logic circuit including decoder equipment which converts the data provided by the high level pulses into decimal form for printing or visual display in conventional manner.

I claim:

1. An elongated insert for a nuclear reactor fuel element whereby the fuel element may be individually identified, the elongated insert bearing a first array of markings at positions spaced along the length of said insert to produce a series of signals on presentation of the elongated insert to a detector responsive to each marking, each marking of said first array being located at a position spaced lengthwise of said insert from other markings of said first array, and a second array of markings at positions spaced along the length of said insert to vary the series of signals produced by the first array of markings on presentation to the detector, the marking of said second array being located at only some of the positions of said first array of markings.

2. An insert as claimed in claim 1 in the form of a metal bar wherein all the markings are holes extending through the bar and the further markings are at right angles to the array at spaced positions.

3. An insert as claimed in claim 1 in the form of a metal bar wherein all the markings are grooves and the further markings are provided by deepened grooves.

4. A nuclear reactor fuel element comprising a nuclear fuel material within a protective sheath and including within the sheath an elongated insert for identifying said fuel element, wherein the insert bears a first array of markings at positions spaced along the length of said insert to produce a series of signals on presentation of the elongated insert to a detector responsive to each marking, each marking of said first array being located at a position spaced lengthwise of said insert from other markings of said first array, and a second array of markings at positions spaced along the length of said insert to vary the series of signals produced by the first array of markings on presentation to the detector, the marking of said second array being located at only some of the positions of said first array of markings.

* * * * *